(12) United States Patent
McKinley et al.

(10) Patent No.: US 7,172,032 B2
(45) Date of Patent: Feb. 6, 2007

(54) GROUND ENGAGING AGRICULTURAL TINE AND ASSOCIATED MOUNTING AND INDEXING SYSTEM

(75) Inventors: Brian J. McKinley, Hope, IN (US); Gary Bailey, Hope, IN (US)

(73) Assignee: Genesis Tillage, Inc., Hope, IN (US)

( * ) Notice: Subject to any disclaimer, the term of this patent is extended or adjusted under 35 U.S.C. 154(b) by 0 days.

(21) Appl. No.: 10/943,168

(22) Filed: Sep. 16, 2004

(65) Prior Publication Data

US 2005/0077060 A1    Apr. 14, 2005

Related U.S. Application Data

(60) Provisional application No. 60/503,372, filed on Sep. 16, 2003.

(51) Int. Cl.
  *A01B 45/02* (2006.01)
(52) U.S. Cl. ............ 172/21; 172/540; 172/549
(58) Field of Classification Search ......... 172/21, 172/22, 55–58, 121–123, 540, 554, 548–550
See application file for complete search history.

(56) References Cited

U.S. PATENT DOCUMENTS

| 1,486,053 | A | * | 3/1924 | Stewart | 172/350 |
| 1,611,358 | A | * | 12/1926 | Miller | 172/594 |
| 2,574,772 | A | * | 11/1951 | Zorn | 172/549 |
| 3,702,639 | A | * | 11/1972 | Womble et al. | 172/568 |
| 4,083,413 | A | * | 4/1978 | Miller | 172/601 |
| 4,224,999 | A | * | 9/1980 | van der Lely | 172/59 |
| 4,383,580 | A | * | 5/1983 | Huxford | 172/21 |
| 4,533,000 | A | * | 8/1985 | van der Lely | 172/68 |
| 4,840,232 | A | * | 6/1989 | Mayer | 172/21 |
| 5,690,179 | A | * | 11/1997 | Dickson | 172/21 |
| 5,934,382 | A | * | 8/1999 | Wilkins | 172/460 |
| 6,666,280 | B1 | * | 12/2003 | Wright et al. | 172/178 |
| 6,854,525 | B2 | * | 2/2005 | Martindale | 172/21 |

* cited by examiner

*Primary Examiner*—Victor Batson
(74) *Attorney, Agent, or Firm*—Woodard, Emhardt, Moriarty, McNett & Henry LLP

(57) ABSTRACT

An agricultural implement has gangs of soil aerator tools. Each gang includes a set of integral multi-tine units mounted on a frame for rotation in unison. Each tine unit has a hub with tines. The hub has a first surface defining a first set of indexing receivers and a second surface defining a second set of indexing receivers. At least one indexing spacer separates each tine unit from the next tine unit. Keys of the indexing spacers assemble with selected ones of the first set of indexing receivers or the second set of indexing receivers to establish and maintain a predetermined pattern of rotational index positions among tine units in a group and groups in a gang.

A method of rotationally indexing agricultural tools in an assembly. One method includes providing a shaft, tine units, and indexing spacers. Assembly involves sliding a tine unit and an indexing spacer onto the shaft, and assembling in series the tine unit and the indexing spacer on the shaft, such that the indexing spacer orients the tine unit to form an assembly.

11 Claims, 16 Drawing Sheets

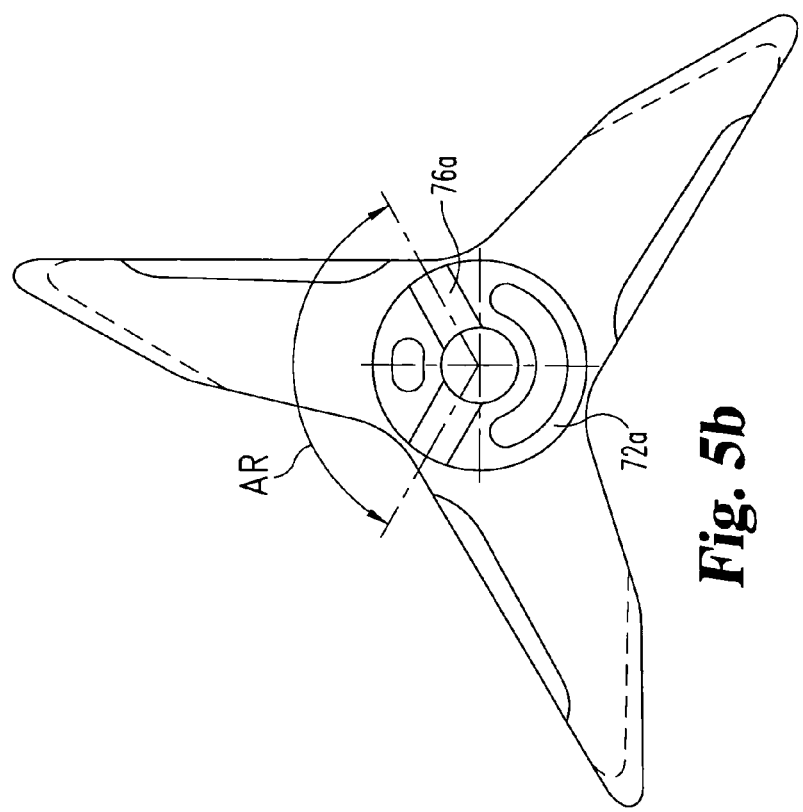
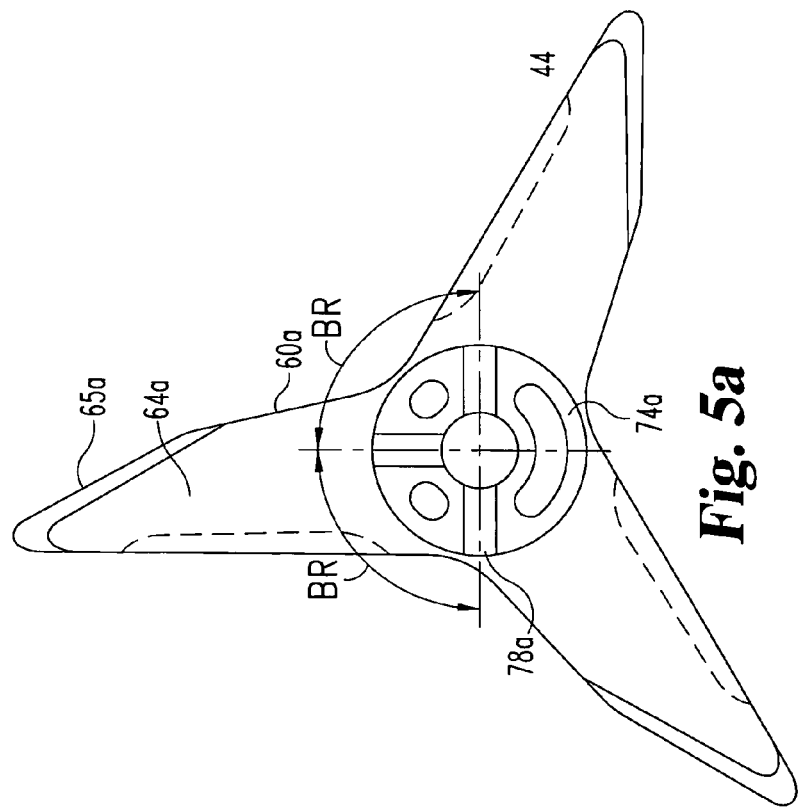

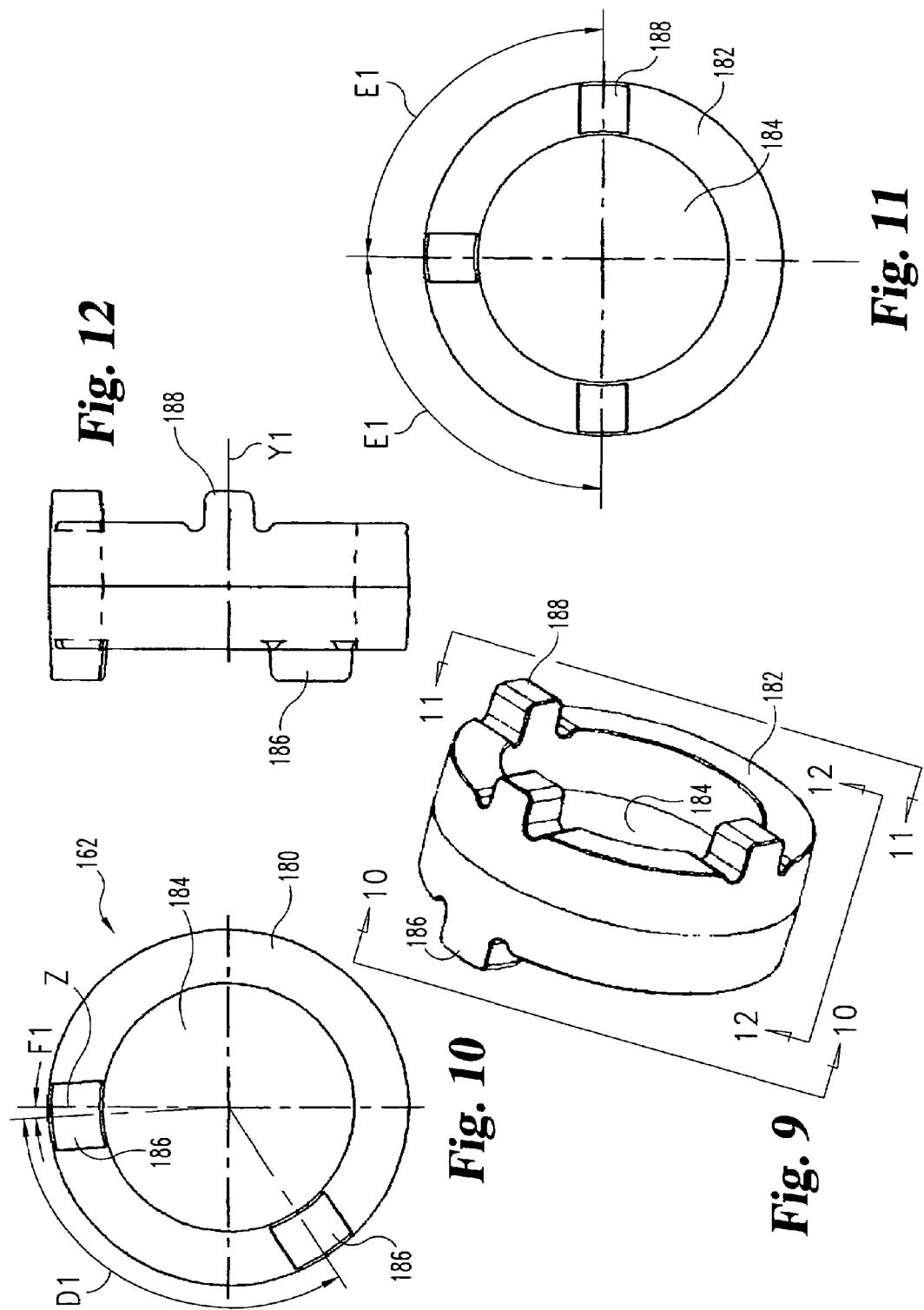

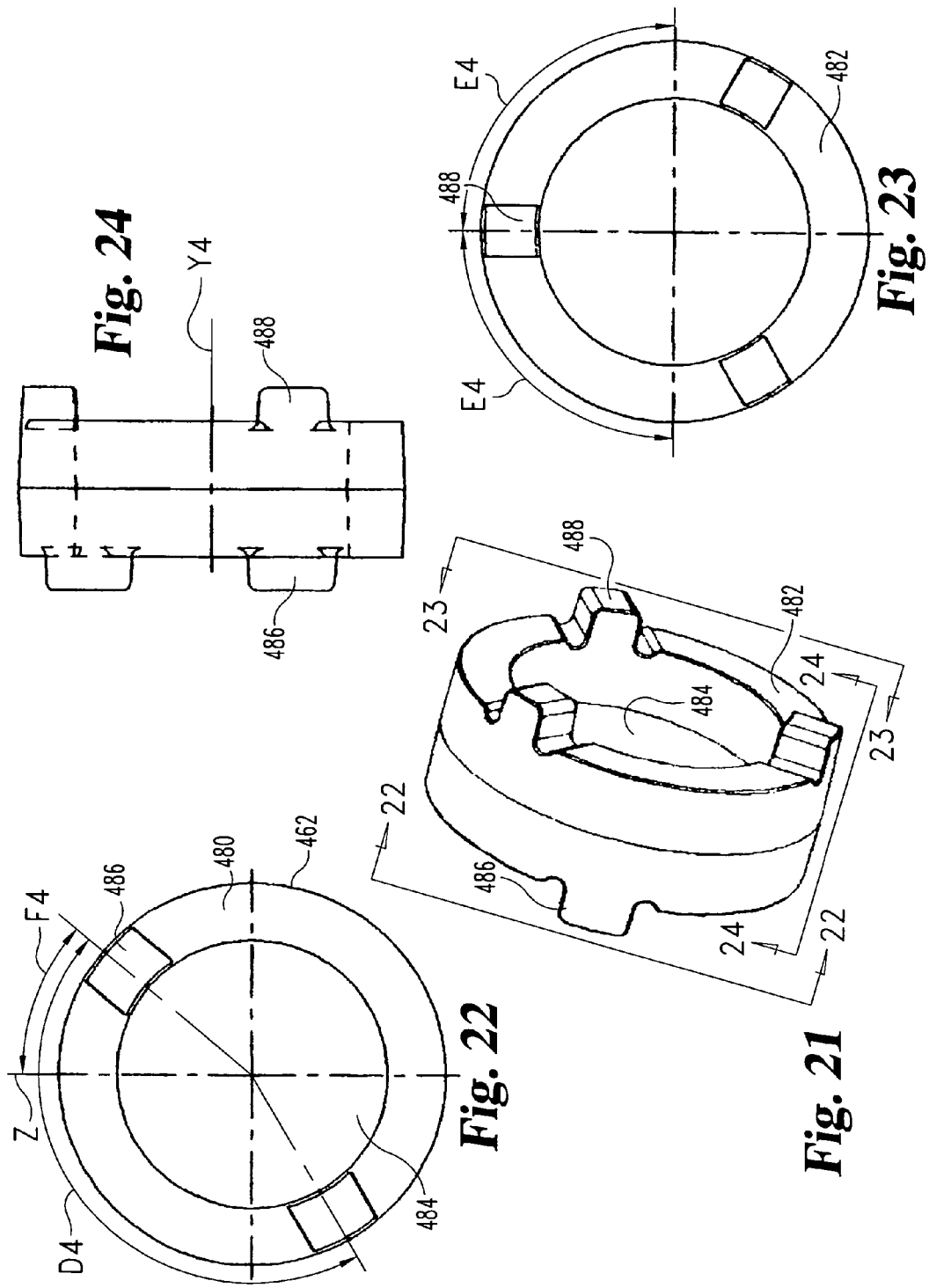

GROUND ENGAGING AGRICULTURAL TINE AND ASSOCIATED MOUNTING AND INDEXING SYSTEM

CROSS REFERENCE TO RELATED APPLICATION

This application claims priority to U.S. Provisional Patent Application Ser. No. 60/503,372, filed Sep. 16, 2003, and incorporated herein by reference.

BACKGROUND OF THE INVENTION

The present invention relates to methods and apparatus for working soil. More specifically, the present invention relates to the use of ground engaging tine units that are mounted on gang assemblies and rotatably advanced in an order determined by an indexing system.

Typically, a tractor is attached to an aerator to pull the aerator behind it. The agriculture industry recognizes the importance of using an aerator for aerating soil. One form of an aerator includes tine units mounted on a frame such that the tines of the tine units penetrate the soil as the tine units are rotated. The rotation and penetration of tine units into the soil can result in vibration of the aerator, which can be uncomfortable for the operator of the tractor. Often the penetration of the tines into soil is aided by the addition of ballast or weight over the tine units. However, the added ballast can affect the size of tractor required to pull the aerator and ballast. In addition, heavy ballast can be difficult, cumbersome, and/or bulky for an operator to lift and place over the aerator.

During operation of the aerator, tine units can pinch the soil between the face of one tine and the backside of the preceding tine. The pinching of soil aggravates soil lifting and root dislodging which predisposes the soil to erosion.

Another form of an aerator includes a pair of gang assemblies separated by a gap and mounted onto a frame such that as the operator passes over an area of soil the entire width of soil is not penetrated by the tine units. Further, a width of soil equal to the gap between the pair of gang assemblies is not penetrated. This gap requires the operator of the aerator to pass over the same area of soil at least twice in order to penetrate the unaerated portion of soil with the tines.

There is a need for an improved aerator. Certain embodiments of the present invention address these and other needs.

SUMMARY OF THE INVENTION

One aspect of some embodiments of the present invention provides an apparatus for working soil. The apparatus includes a plurality of tine units mounted in series for rotation about a rotational axis. Each of the tine units has a plurality of tines and a first surface with a first set of indexing receivers and a second surface with a second set of indexing receivers. The apparatus includes at least one indexing spacer which separates one tine unit from an adjacent tine unit. The indexing spacer has lugs for assembling with selected ones of the first set of indexing receivers or the second set of indexing receivers of the hub.

Another aspect of some embodiments of the present invention provides an apparatus for working soil. The apparatus includes a frame and a plurality of tine units. Each tine unit has a hub with a plurality of tines extending from the hub. A plurality of indexing spacers is provided, at least one of the spacers being used to separate each tine unit from the next adjacent tine unit in the series. Each of the indexing spacers has a first face adapted to repeatedly assemble with and repeatedly disassemble from one of the plurality of tine units.

Yet another aspect of some embodiments of the present invention includes an apparatus for working soil including a first gang assembly and a second gang assembly suspended from a frame. The first gang assembly is offset a distance in a direction of travel from the second gang assembly. The first gang assembly and the second gang assembly extend toward a centerline of the frame in the direction of travel. A portion of the first gang assembly intercepts a vertical plane containing the centerline.

Another aspect of some embodiments of the present invention provides a method of indexing tools in an assembly. The method includes providing a shaft, a plurality of tine units, and a plurality of indexing spacers, sliding one of the plurality of tine units onto the shaft for rotation about a rotational axis of the shaft, and sliding one of the indexing spacers onto the shaft for rotation about the rotational axis of the shaft. The method also includes that the indexing spacer orients the tine unit to form an assembly.

Another aspect of some embodiments of the present invention provides an agricultural implement which includes a gang of tine units mounted in series for rotation about an axis, each unit having a hub and tines extending outward relative to said axis and inter-engaging means on said tine units to establish a predetermined angular orientation between adjacent tine units.

Another aspect of some embodiments of the present invention provides a method of indexing tools in an agricultural machine including a plurality of tine units, wherein adjacent tine units include interlocking features designed and adapted to interlock with the interlocking features of an adjacent tine unit in order to maintain said tine units in a predetermined angular orientations as an assembly.

These and other aspects of the present invention will be apparent from the drawings, claims, and text to follow.

BRIEF DESCRIPTION OF THE DRAWINGS

FIG. 5*a* is an end view of a right hand tine unit according to one illustrated embodiment of the present invention.

FIG. 5*b* is an opposite end view of a right hand tine unit of FIG. 5*a*.

FIG. 9 is a perspective view of an indexing spacer according to one illustrated embodiment of the present invention.

FIG. 10 is an end view of the indexing spacer of FIG. 9 taken along line 10—10 in FIG. 9 and viewed in the direction of the arrows.

FIG. 11 is an end view of the indexing spacer of FIG. 9 taken along line 11—11.

FIG. 12 is a side view of the indexing spacer of FIG. 9 taken along line 12—12.

FIG. 21 is a perspective view of an indexing spacer according to another embodiment of the present invention.

FIG. 22 is an end view of the indexing spacer of FIG. 21 taken along line 22—22.

FIG. 23 is an end view of the indexing spacer of FIG. 21 taken along line 23—23.

FIG. 24 is a side view of the indexing spacer of FIG. 21 taken along line 24—24.

DESCRIPTION OF THE ILLUSTRATED EMBODIMENT

Figure 1:
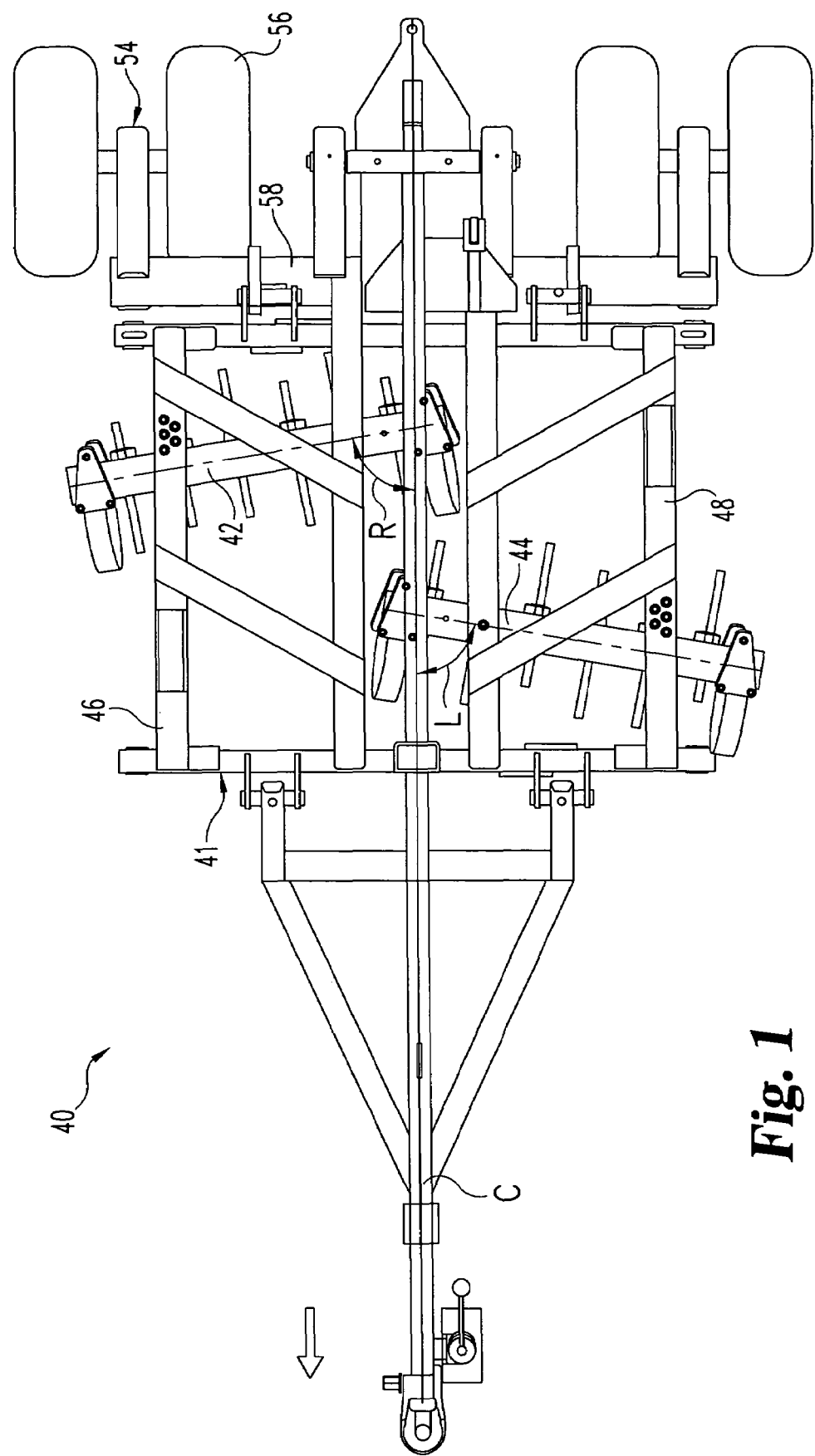
FIG. 1 is a top view of an aerator according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 shows an aerator 40 for aerating soil according to one embodiment of the present invention. Typically, the aerator 40 is attached to a tractor (not shown in FIG. 1) to pull the aerator 40. As discussed below, right refers to the right side of the aerator 40 in the direction of travel and left refers to the left side of the aerator 40 in the direction of travel. The direction of travel is shown in FIG. 1 as an arrow. Aerator 40 comprises a frame 41, a right arm 42 connected to the frame 41, and a left arm 44 connected to the frame 41. The frame 41 includes a right side 46 and a left side 48. Both the right arm 42 and the left arm 44 extend in a forwardly inclined direction converging toward a centerline, C, of the frame 41 in the direction of travel. The right arm 42 extends toward the right side 46 of the frame 41. The right arm 42 and the centerline, C, form an angle, R. The angle, R, is typically in the range of 70° to 90°. The angle, R, can be different in other embodiments. The left arm 44 extends toward the left side 48 of the frame 41. The left arm 44 and the centerline, C, form an angle, L. The angle, L, is typically in the range of 70° to 90°. Aerator 40 further comprises a right gang assembly 50 mounted to the right arm 42 and a left gang assembly 52 mounted to the left arm 44. In one embodiment of the present invention, aerator 40 includes a wheel assembly 54 attached to the rear of the aerator 40. In this embodiment, the wheel assembly 54 includes wheels 56 rotatably mounted to a wheel frame 58.

Figure 2:
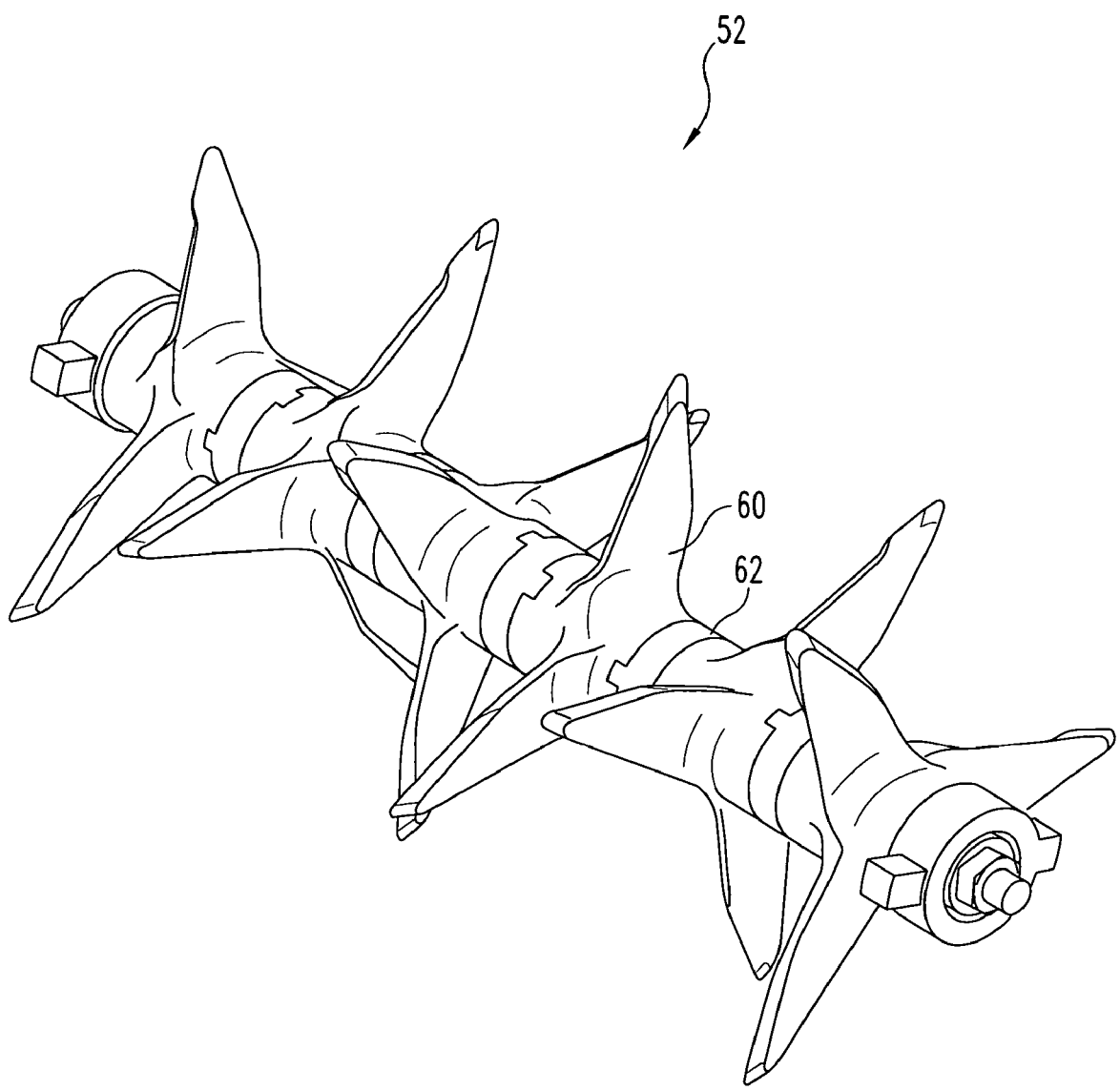
FIG. 2 is a perspective view of a gang assembly incorporating an embodiment of the present invention for the FIG. 1 aerator.

One embodiment of either the right gang assembly 50 or the left gang assembly 52 is shown in FIG. 2. The right gang assembly 50 is similar to the left gang assembly 52. A typical gang assembly 52 comprises a plurality of tine units 60 and a plurality of indexing spacers 62. For example in FIG. 2, the left gang assembly 52 comprises six tine units 60 and five indexing spacers 62. As another example in FIG. 1, the right gang assembly 50 has nine tine units and the left gang assembly 52 has nine tine units. In some embodiments, each of the tine units 60 is separated from another tine unit by one of the indexing spacers 62. Further, each of the indexing spacers 62 couples with two of the tine units 60 as described below. In some embodiments of the present invention at least one of the tine units 60 intercepts a vertical plane containing the centerline, C, of the frame 41 as shown in FIG. 1, in order to aerate the soil below the centerline.

In the illustrated embodiment, the right gang assembly 50 rotates or turns the same number of degrees between each soil penetration by a tine throughout the full revolution of the right gang assembly 50. Similarly to the right gang assembly 50, the left gang assembly 52 also rotates or turns the same number of degrees between each soil penetration by a tine throughout the full revolution of the left gang assembly 52. Therefore, in some embodiments lighter ballast or no ballast is required to add to the frame 41 to aid the soil penetration of the tines. Beneficially, lighter ballast is easier for the operator to lift or place over the frame 41 and lighter ballast can require a smaller tractor to pull it. In addition, the action of any given tine in the right gang assembly 50 is isolated from the action of the preceding and following tines in the rotation of the right gang assembly 50. Similarly, the action of any given tine in the left gang assembly 52 is isolated from the action of the preceding and following tines in the rotation of the left gang assembly 52. Therefore, the soil is not pinched between the face of one tine and the back-side of the preceding tine as the right gang assembly 50 is rotated or the left gang assembly 52 is rotated.

Figure 3:
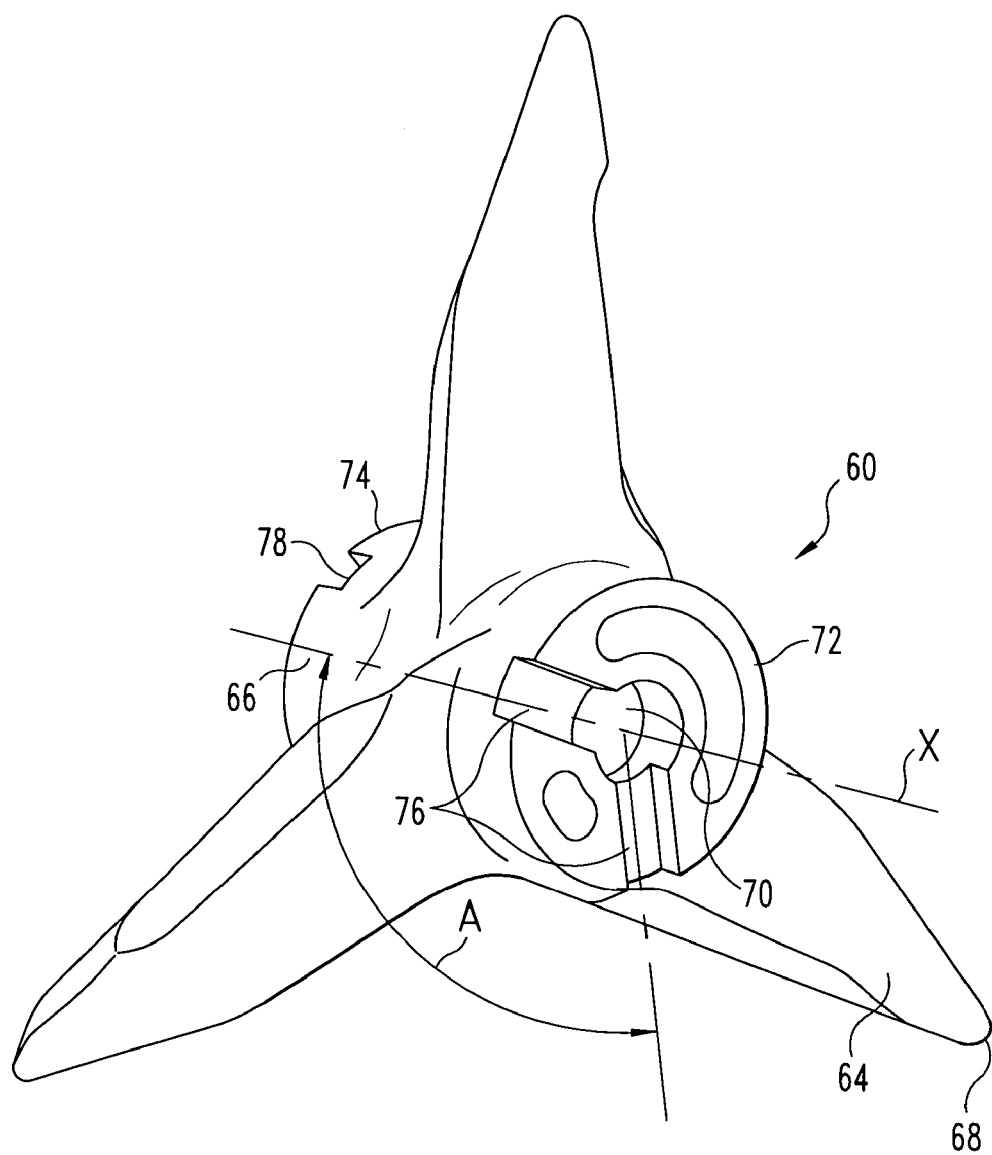
FIG. 3 is an enlarged perspective view of a tine unit for the FIG. 2 gang assembly.

As shown in FIG. 3, the tine unit 60 includes a plurality of tines 64 integrally formed with a hub 66. The tine unit 60 can be cast from various metals, such as ductile iron or steel, to name a few. Each of the tines 64 includes a tine tip 68 for working the soil as the aerator 40 moves. The tines 64 are triangular in shape, however other shapes may be used as desired. The tines 64 are also preferably the same size in the illustrated embodiment. Each of the tines 64 penetrates into the soil a similar depth as the gang assembly rotates. The hub 66 is preferably circular in shape. In this embodiment, the hub 66 has a diameter of 5.0". The hub diameter and shape can be different in other embodiments. The hub 66 defines a bore 70 in the center of the hub 66. In the illustrated embodiment, the diameter of the bore 70 is 1.5". In other embodiments, the bore diameter can be different. The hub 66 has a first face 72 and a second face 74 facing in opposite directions. As shown, the width from face to face is 5.7", but in other embodiments the width can be different. First face 72 defines a first interlocking feature, such as indexing receivers or grooves 76, of a first set to enable repeatedly assembling with and dis-assembling from a plurality of indexing spacers 62 having a second set of interlocking features as described below. In this embodiment, the indexing grooves 76 of the first set consist of two indexing grooves, but can be any shape that is interlockable with the second set of interlocking features, including first and second interlocking features that are complementary in shape. Beneficially the first face 72 assembles with and dis-assembles from the indexing spacers 62 which allows a user to quickly change the tine unit 60 for another tine unit, for example, for maintenance of the right gang assembly 50 or the left gang assembly 52. The indexing grooves 76 of the first set are rectangular in shape, however other shapes such as circular, trapezoidal, or square may be used as desired. The indexing grooves 76 are circumferentially indexed through an angle, A, relative to the bore axis, X. In this illustrated embodiment, the angle, A, is 120°. The angle, A, can be different in other embodiments. Second face 74 defines indexing grooves or receivers 78 of a second set to enable repeatedly assembling with and dis-assembling from indexing spacers 62 of another of the plurality as described below. In this embodiment, the indexing grooves 78 of the second set consist of three indexing grooves. In other embodiments, the indexing grooves 78 of the second set can be any number of indexing grooves. The indexing grooves 78 of the second set are rectangular in shape, however other shapes such as circular, trapezoidal, or square may be used as desired. The indexing grooves 78 are circumferentially indexed through an angle, B, relative to the bore axis, X. The angle, B, is 90°. The angle, B, can be different in alternate embodiments.

Figure 6:
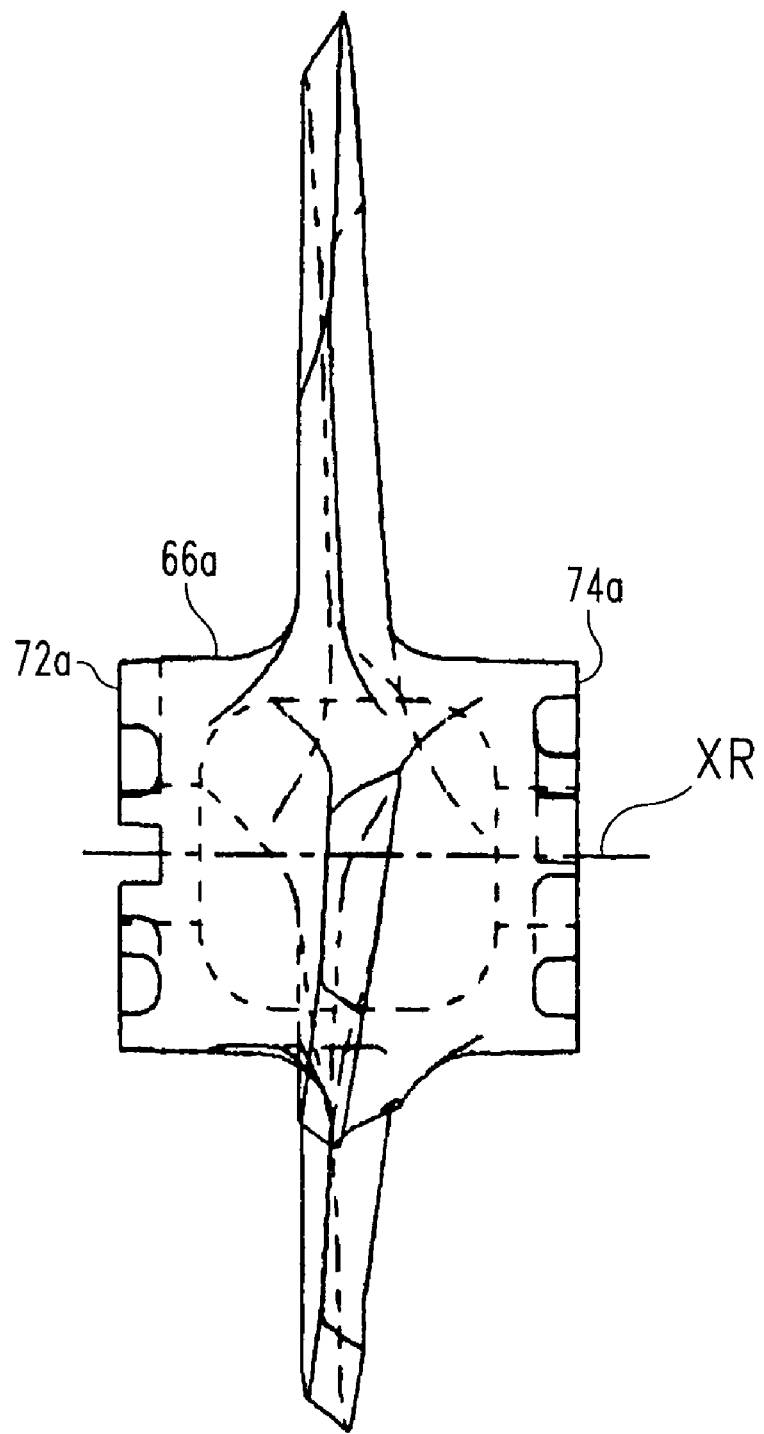
FIG. 6 is a side view of the right hand tine unit of FIG. 5*a*.

According to the illustrated embodiment in FIGS. 5a, 5b, and 6, a right hand tine unit 60a is shown. Right hand tine unit 60a is similar to tine unit 60. The right hand tine unit 60a includes a plurality of tines 64a integrally formed with a hub 66a. Each of the plurality of tines 64a includes a cutting edge 65a for engaging the soil. The hub 66a has a first face 72a and a second face 74a facing in opposite directions. First face 72a (FIG. 5b) defines indexing grooves 76a of a first set that are similar to the indexing grooves 76 of the first set of tine unit 60. The indexing grooves 76a are circumferentially indexed through an angle, AR, relative to the bore axis, XR. In this embodiment, the angle, AR, is 120°, however the angle, AR, can be different in alternate embodiments. Second face 74a (FIG. 5a) defines indexing grooves 78a of a second set similar to the indexing grooves 78 of the second set of tine unit 60. The indexing grooves 78a are circumferentially indexed through an angle, BR, relative to the bore axis, XR. In this embodiment, the angle, BR, is 90°, however the angle, BR, can be different in other embodiments.

Figure 7B:
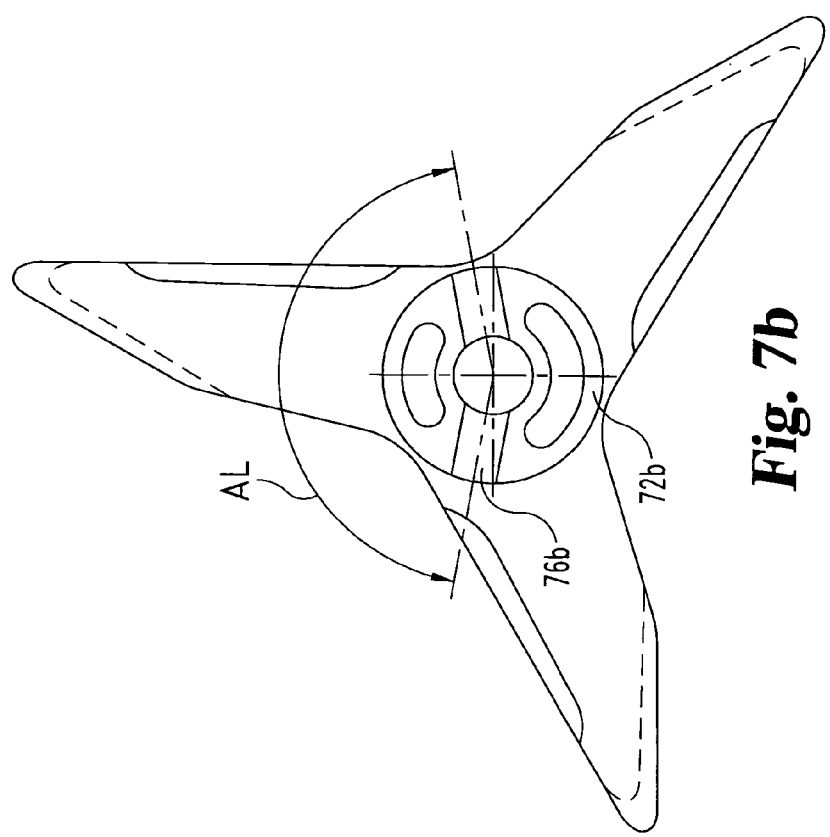
FIG. 7*b* is an opposite end view of a left hand tine unit of FIG. 7*a*.
Figure 7A:
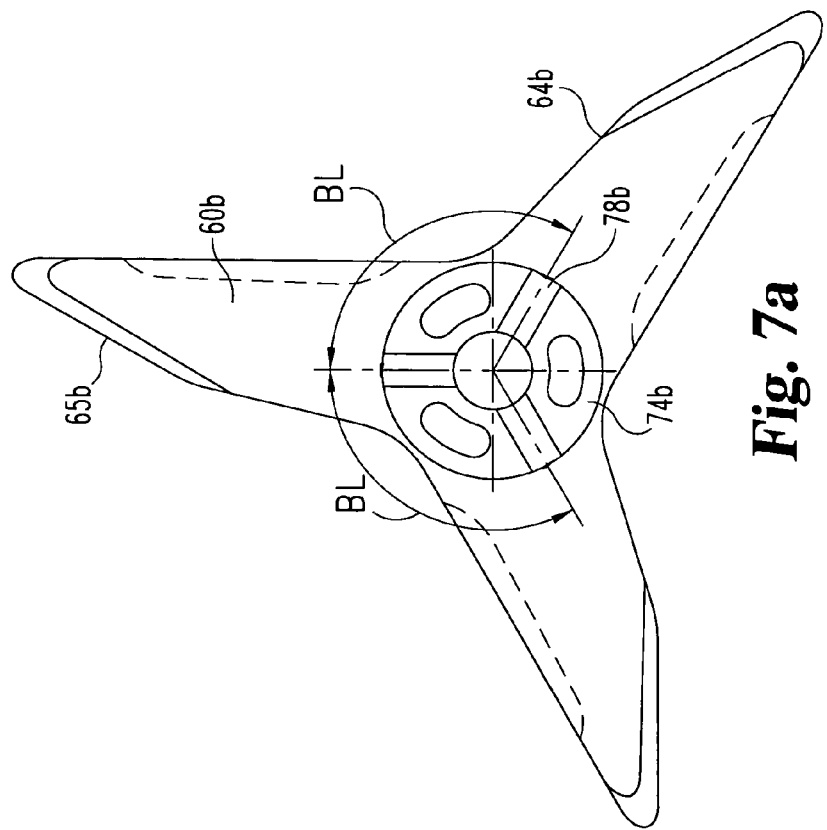
FIG. 7*a* is an end view of a left hand tine unit according to one illustrated embodiment of the present invention.
Figure 8:
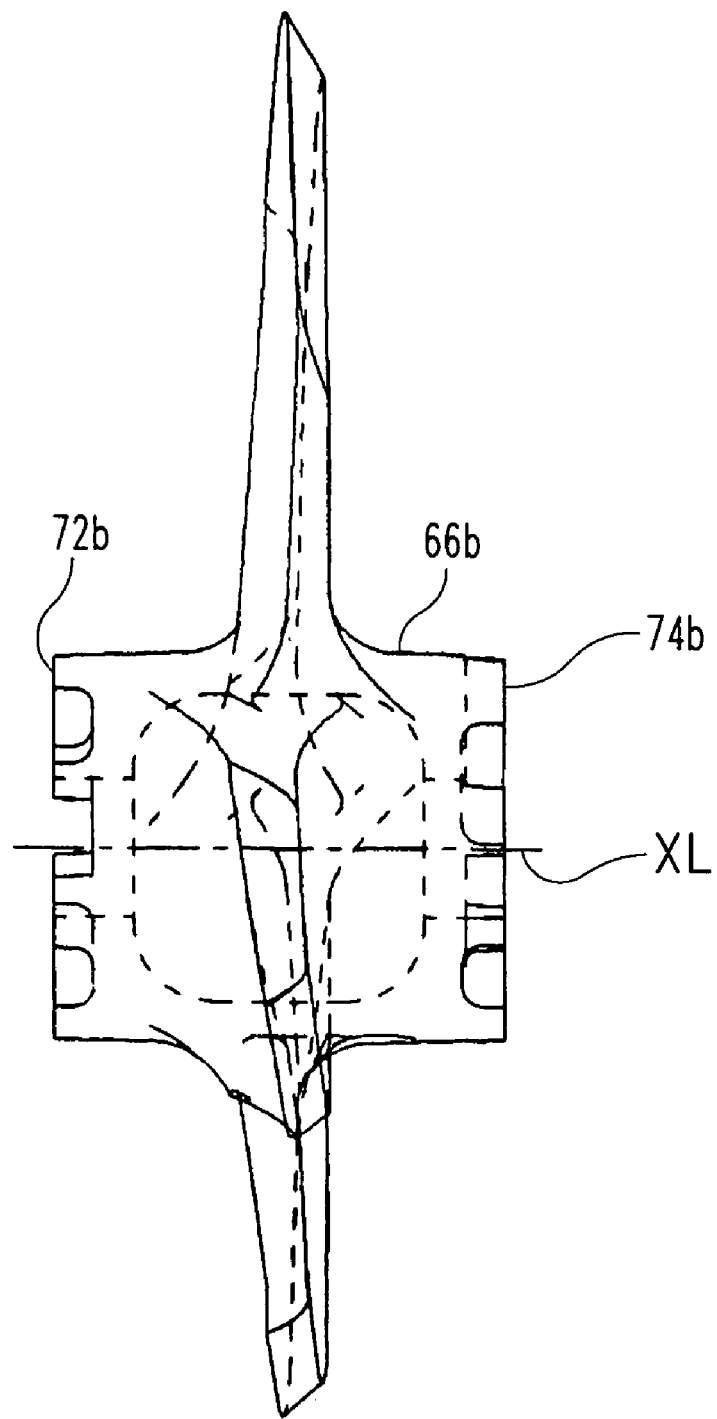
FIG. 8 is a side view of the left hand tine unit of FIG. 7*a*.
Figure 16:
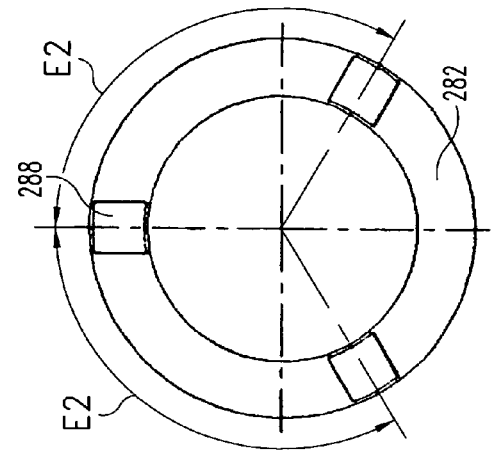
FIG. 16 is a side view of the indexing spacer of FIG. 13 taken along line 16—16.

In an embodiment illustrated in FIGS. 7a, 7b, and 8, a left hand tine unit 60b is shown. Left hand tine unit 60b is similar to tine unit 60. The left hand tine unit 60b includes a plurality of tines 64b integrally formed with a hub 66b. Each of the plurality of tines 64b includes a cutting edge 65b for engaging the soil. The hub 66b has a first face 72b and a second face 74b facing in opposite directions. First face 72b defines indexing grooves 76b of a first set similar to the indexing grooves 76 of the first set of tine unit 60. The indexing grooves 76b are circumferentially indexed through an angle, AL, relative to the bore axis, XL. In this embodiment, the angle, AL, is 160°, however the angle, AL, can be different in alternate embodiments. Second face 74b defines indexing grooves 78b of a second set similar to the indexing grooves 78 of the second set of tine unit 60. The indexing grooves 78b are circumferentially indexed through an angle, BL, relative to the bore axis, XL. In this embodiment, the angle, BL, is 90°, however the angle, BL, can be different in alternate embodiments.

The right hand tine unit 60a and the left hand tine unit 60b can not be used intermixedly in the right gang assembly 50 and the left gang assembly 52. The indexing grooves of the right hand tine unit 60a and the indexing grooves of the left hand tine unit 60b enable securing the various lugs of the indexing spacers as the gang assemblies are assembled as discussed below. The indexing grooves 76a are circumferentially indexed through an angle different than indexing grooves 76b and the indexing grooves 78a are circumferentially indexed through an angle different than indexing grooves 78b. Therefore, the right hand tine units 60a and the left hand tine units 60b can not be intermixed in the right gang assembly 50 and the left gang assembly 52. Further, the operator can detect the different angles between the indexing grooves of the right hand tine units 60a and angles between the indexing grooves of the left hand tine units 60b to place a tine unit on the appropriate gang assembly.

The right hand tine unit 60a and the left hand tine unit 60b also differ in which edge of the tine is the cutting edge that contacts and cuts into the soil first. The cutting edge 65a of the right hand tine unit 60a is closest to the right side 46 of the frame 41 when the right hand tine unit 60a is assembled in the right gang assembly 50. The cutting edge 65b of the left hand tine unit 60b is closest to the left side 48 of the frame 41 when the left hand tine unit 60b is assembled in the left gang assembly 52. The placement of the cutting edge 65a results in an inward movement of the soil as the soil is cut by the cutting edge 65a. Similarly, the placement of the cutting edge 65b results in an inward movement of the soil as the soil is cut by the cutting edge 65b.

Figure 4:
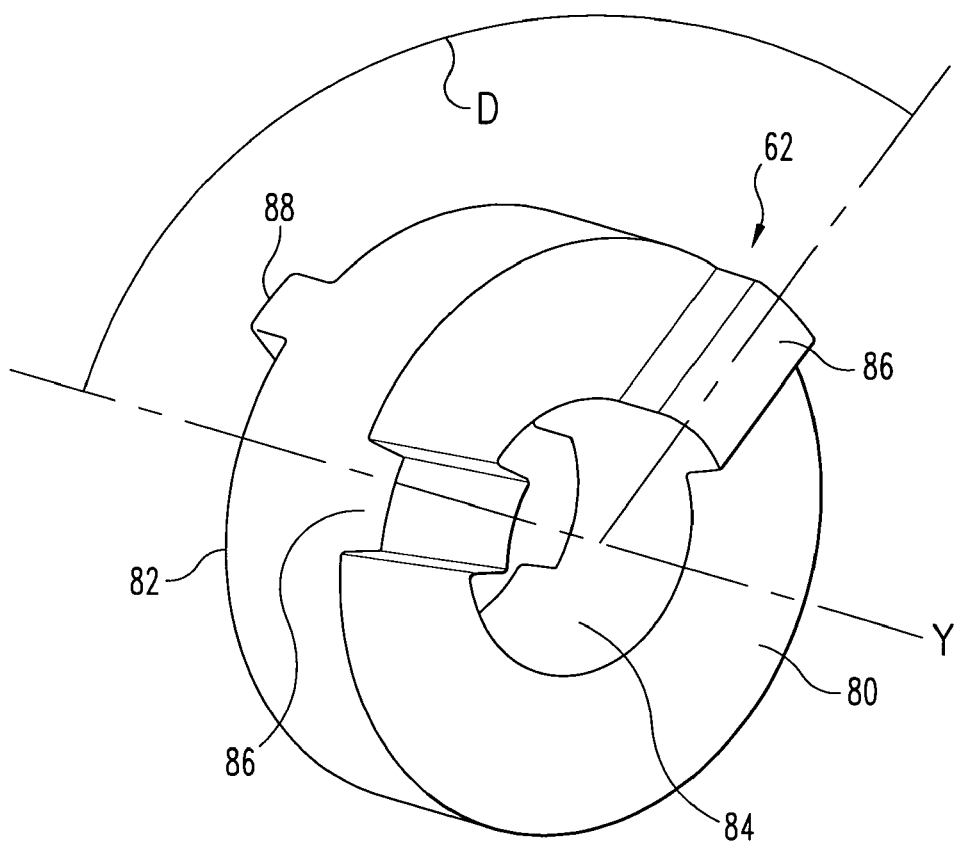
FIG. 4 is an enlarged perspective view of an indexing spacer of the FIG. 2 gang assembly.

As illustrated in FIG. 4, the indexing spacer 62 includes a first face 80 and a second face 82 facing in opposite directions. In this embodiment, the width from face to face is 2.67", however in alternate embodiments the width can be different. The indexing spacer 62 is circular in shape and defines a passageway 84. The indexing spacer 62 has a diameter of 5.0" in this embodiment, but in other embodiments the diameter may be different. As shown, the diameter of the indexing spacer 62 is the same as the diameter of the hub 66. The passageway 84 is also circular in shape with a diameter of 3.5". It should be appreciated that in other embodiments, the diameter of passageway 84 can be different. First face 80 includes lugs 86 of a first set to enable repeatedly assembling with and dis-assembling from one of either the indexing grooves 76 of the first set or the indexing grooves 78 of the second set of a tine unit. The lugs 86 of the first set are rectangular in shape, however other shapes such as circular, trapezoidal, or square may be used as desired. As illustrated, the lugs 86 of the first set are similar in shape and size as the indexing grooves 76 of the first set in the tine hub face 72 (FIG. 3). Further, each of the lugs 86 is circumferentially indexed through an angle, D, relative to a passageway axis, Y, as shown in FIG. 4. The lugs 86 of the first set are configured to mate or fit with the indexing grooves 76 of the first set in the tine hub face 72. It should be appreciated that the lugs 86 can be exchanged with the indexing grooves 76 such that the first face 72 of the tine unit can include lugs 86 and the first face 80 of the indexing spacer can include the indexing grooves 76 or each face can include a mix of lugs and indexing grooves. Therefore, wherever lug is mentioned the discussion also applies to indexing groove and wherever indexing groove is mentioned the discussion also applies to lugs. It is understood that the lugs and indexing grooves are interfitting pieces or features of an indexing system. Further, it is understood that reversal of features of the lugs and indexing grooves is intended. Second face 82 includes lugs 88 of a second set to enable repeatedly assembling with and dis-assembling from another of either the indexing grooves 76 of the first set or the indexing grooves 78 of the second set. The lugs 88 of the second set are rectangular in shape, however other shapes such as circular, trapezoidal, or square may be used as desired. In this embodiment, the lugs 88 of the second set are similar in shape and size as the indexing grooves 78 of the second set (FIG. 3). Further, each of the lugs 88 is circumferentially indexed through an angle, E (not shown in FIG. 4), relative to the passageway axis Y. In other embodiments, the lugs 86 of the first set can be similar in shape and size as the indexing grooves 78 of the second set and the lugs 88 of the second set can be similar in shape and size as the indexing grooves 76 of the first set. The lugs 88 of the second set are configured to mate or fit with the indexing grooves 78 of the second set.

Although specific types of indexing grooves and indexing spacers have been shown and described, the present invention contemplates other shapes, sizes, and methods for providing a predetermined angular orientation between adjacent tine units. As one example, the present invention contemplates switching the arrangement of lugs on spacers and receivers on tine units, such that there are lugs on the tine units and receivers on the spacers. Further, some embodiments do not include spacers, such that interlocking indexing features are present on the hub of the tine unit, and one hub interlocks directly with another hub. As another example, the present invention contemplates that the hub has tines that attach or detach from the hub. Further, it is contemplated some embodiments have interlocking indexing features on the hub such that the indexing features of a first hub can lock with either indexing features of a second hub or with a spacer.

In the embodiment illustrated in FIGS. 9, 10, 11, and 12, an indexing spacer 162 is shown. The indexing spacer 162 is similar to the indexing spacer 62. The indexing spacer 162 includes a first face 180 and a second face 182 facing in opposite directions. In this embodiment, the width from face to face is 2.67", however in alternate embodiments the width can be different. The indexing spacer 162 is circular in shape and defines a passageway 184. The indexing spacer 162 has a diameter of 5.0" in this embodiment, but in other embodiments the diameter may be different. As shown, the diameter of the indexing spacer 162 is the same as the diameter of the hub 166. The passageway 184 is also circular in shape with a diameter of 3.5". It should be appreciated that in other embodiments, the diameter of passageway 184 can be different. First face 180 includes lugs 186 of a first set to enable repeatedly assembling with and dis-assembling from one of either the indexing grooves 76 of the first set or the indexing grooves 78 of the second set. The lugs 186 of the first set are rectangular in shape; however, other shapes such as circular, trapezoidal, or square may be used as desired. Further, the lugs 186 are circularly indexed through an angle, D1, relative to a passageway axis, Y1. As illustrated in FIG. 10, the lugs 186 of the first set include a pair of lugs circularly indexed through the angle, D1, of 121°. In the illustrated embodiment, the first of the lugs 186 is circularly indexed through an angle F1 measured from a vertical plane, Z. The angle F1 is 2.5° in this embodiment and the angle, F1, can vary in other embodiments. In other embodiments, the number of lugs 186 and the angle, D1, can vary as desired. As shown in FIG. 11, second face 182 includes lugs 188 of the second set to enable repeatedly assembling with and dis-assembling from another of either the indexing grooves 76 of the first set or the indexing grooves 78 of the second set. In this embodiment, the lugs 188 of the second set consist of three lugs 188; however, in other embodiments the number of lugs 188 can be different. The lugs 188 of the second set are rectangular in shape, however other shapes such as circular, trapezoidal, or square may be used as desired. In this embodiment, the lugs 188 of the second set are similar in shape and size as the indexing grooves 78 of the second set. Further, the lugs 188 are circularly indexed through an angle, E1, relative to a passageway axis, Y1. As illustrated in FIG. 11, the angle, E1, is 90°.

Figure 15:
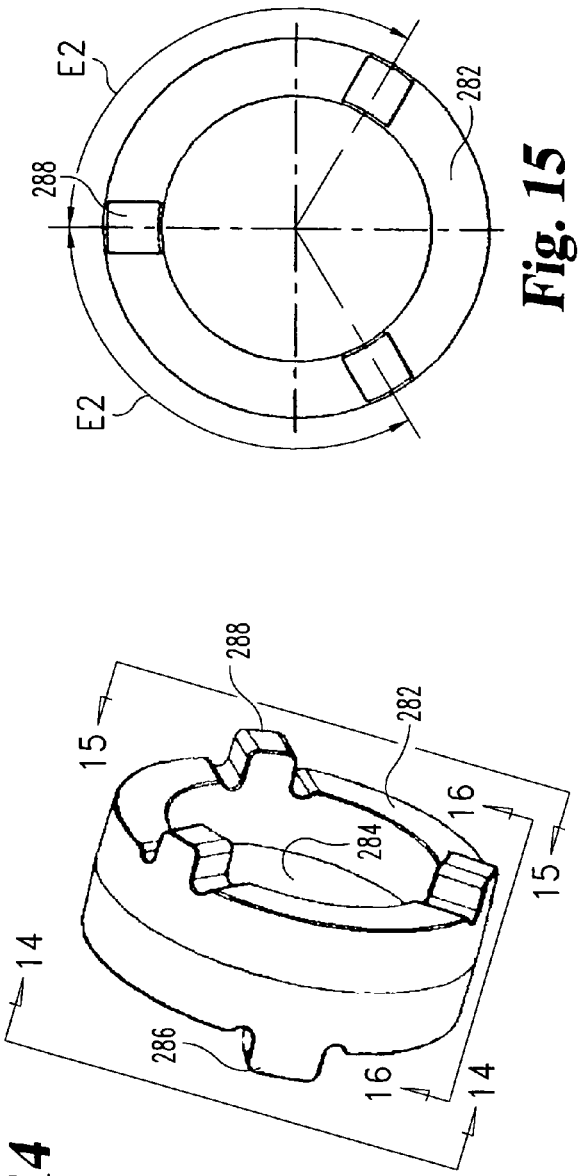
FIG. 15 is an end view of the indexing spacer of FIG. 13 taken along line 15—15.
Figure 14:
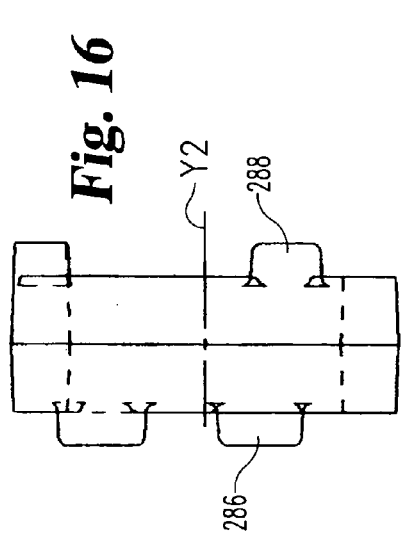
FIG. 14 is an end view of the indexing spacer of FIG. 13 taken along line 14—14.
Figure 13:
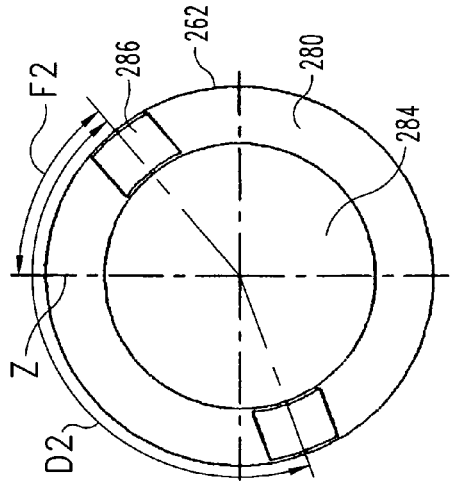
FIG. 13 is a perspective view of an indexing spacer according to another embodiment of the present invention.

In the embodiment illustrated in FIGS. 13, 14, 15, and 16, an indexing spacer 262 is shown. The indexing spacer 262 is similar to the indexing spacer 62. The indexing spacer 262 includes a first face 280 and a second face 282 facing in opposite directions. The indexing spacer 262 defines a passageway 284. First face 280 includes lugs 286 of the first set to enable repeatedly assembling with and dis-assembling from one of either the indexing grooves 76 of the first set or the indexing grooves 78 of the second set. The lugs 286 of the first set are rectangular in shape; however, other shapes such as circular, trapezoidal, or square may be used as desired. Further, the lugs 286 are circularly indexed through an angle, D2, relative to a passageway axis, Y2. As illustrated in FIG. 14, the lugs 286 of the first set include a pair of lugs circularly indexed through the angle, D2, of 160°. In the illustrated embodiment, the first of the lugs 286 is circularly indexed through an angle, F2, measured from a vertical plane, Z. The angle, F2, is 50° in this embodiment. As shown in FIG. 15, second face 282 includes lugs 288 of the second set to enable repeatedly assembling with and dis-assembling from another of either the indexing grooves 76 of the first set or the indexing grooves 78 of the second set. In this embodiment, the lugs 288 of the second set consist of three lugs 288; however, in other embodiments the number of lugs 288 can be different. The lugs 288 of the second set are rectangular in shape, however other shapes such as circular, trapezoidal, or square may be used as desired. In this embodiment, each of the lugs 288 is are circularly indexed through an angle, E2, relative to a passageway axis, Y2. As illustrated in FIG. 15, the angle, E2, is 120°.

Figure 19:
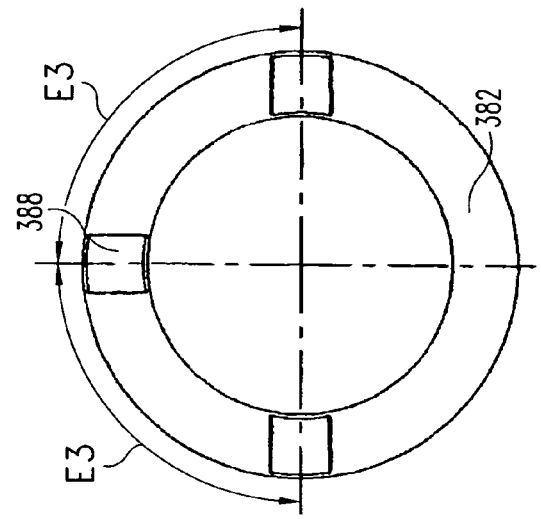
FIG. 19 is an end view of the indexing spacer of FIG. 17 taken along line 19—19.
Figure 20:
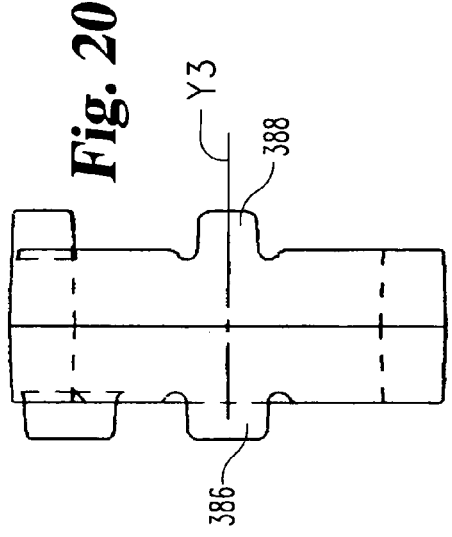
FIG. 20 is a side view of the indexing spacer of FIG. 17 taken along line 20—20.
Figure 17:
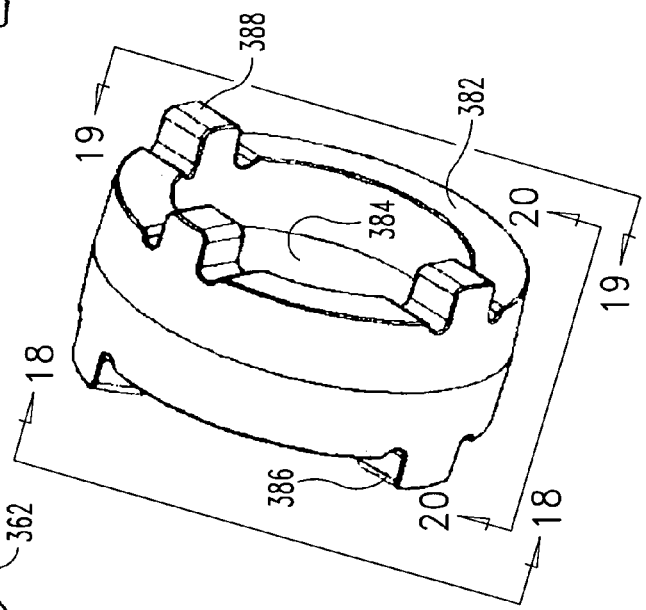
FIG. 17 is a perspective view of an indexing spacer according to yet another embodiment of the present invention.
Figure 18:
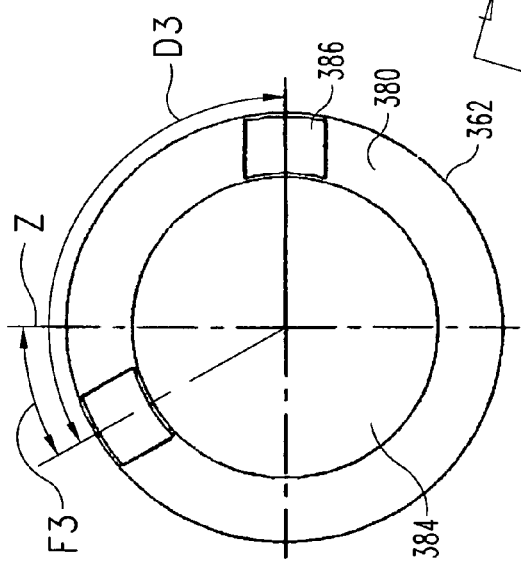
FIG. 18 is an end view of the indexing spacer of FIG. 17 taken along line 18—18.

In the embodiment illustrated in FIGS. 17, 18, 19, and 20, an indexing spacer 362 is shown. The indexing spacer 362 is similar to the indexing spacer 62. The indexing spacer 362 includes a first face 380 and a second face 382 facing in opposite directions. The indexing spacer 362 defines a passageway 384. First face 380 includes lugs 386 of the first set to enable repeatedly assembling with and dis-assembling from one of either the indexing grooves 76 of the first set or the indexing grooves 78 of the second set. The lugs 386 are circularly indexed through an angle, D3, relative to a passageway axis, Y3. As illustrated in FIG. 18, the lugs 386 of the first set include a pair of lugs circularly indexed through the angle, D3, of 120°. In the illustrated embodiment, the first of the lugs 386 is circularly indexed through an angle, F3, measured from a vertical plane, Z. The angle, F3, is 30° in this embodiment. As shown in FIG. 19, second face 382 includes lugs 388 of the second set to enable repeatedly assembling with and dis-assembling from another of either the indexing grooves 76 of the first set or the indexing grooves 78 of the second set. In this embodiment, the lugs 388 of the second set consist of three lugs 388; however, in other embodiments the number of lugs 388 can be different. In this embodiment, each of the lugs 388 is circularly indexed through an angle, E3, relative to a passageway axis, Y3. As illustrated in FIG. 19, the angle, E3, is 90°.

In the embodiment illustrated in FIGS. 21, 22, 23, and 24, an indexing spacer 462 is shown. The indexing spacer 462 is similar to the indexing spacer 62. The indexing spacer 462 includes a first face 480 and a second face 482 facing in opposite directions. The indexing spacer 462 also defines a passageway 484. First face 480 includes lugs 486 of the first set to enable repeatedly assembling with and dis-assembling from one of either the indexing grooves 76 of the first set or the indexing grooves 78 of the second set. The lugs 486 are circularly indexed through an angle, D4, relative to a passageway axis, Y4. As illustrated in FIG. 22, the lugs 486 of the first set include a pair of lugs circularly indexed through the angle, D4, of 160°. In the illustrated embodiment, the first set of lugs 486 is circularly indexed through an angle, F4, measured from a vertical plane, Z. The angle, F4, is 40° in this embodiment. In alternate embodiments, the number of lugs 486 and the angle, D4, can vary as desired. As shown in FIG. 23, second face 482 includes lugs 488 of the second set to enable repeatedly assembling with and dis-assembling from another of either the indexing grooves 76 of the first set or the indexing grooves 78 of the second set. In this embodiment, the lugs 488 of the second set consist of three lugs 488. In alternate embodiments, any number of lugs 488 can be used as desired. In this embodiment, each of the lugs 488 is circularly indexed through an angle, E4, relative to a passageway axis, Y4. As illustrated in FIG. 23, the angle, E4, is 120°; however, in alternate embodiments the angle, E4, can vary as desired.

Figure 27:
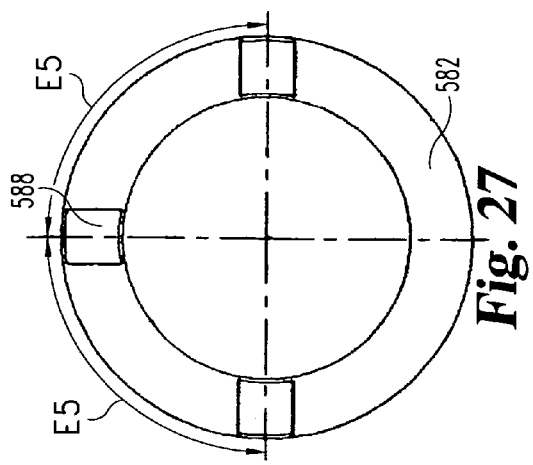
FIG. 27 is an end view of the indexing spacer of FIG. 25 taken along line 27—27.
Figure 28:
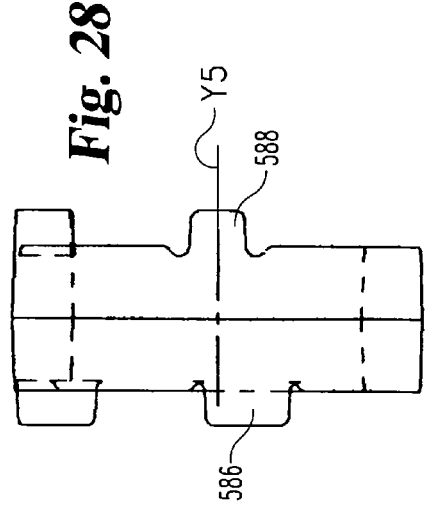
FIG. 28 is a side view of the indexing spacer of FIG. 25 taken along line 28—28.
Figure 25:
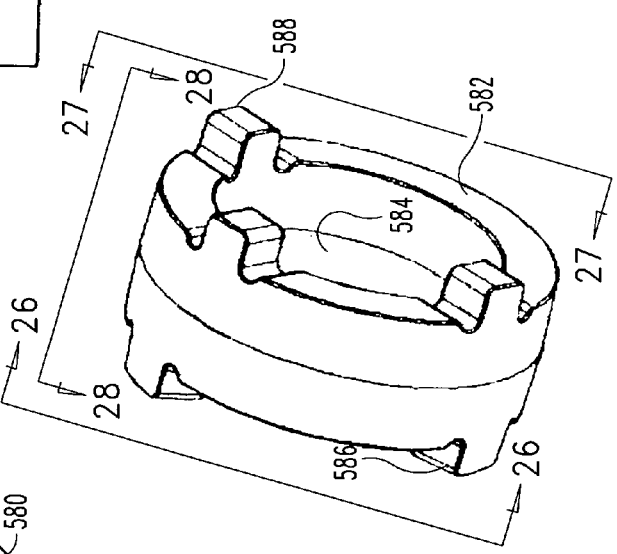
FIG. 25 is a perspective view of an indexing spacer according to yet another pattern of spacing lugs.
Figure 26:
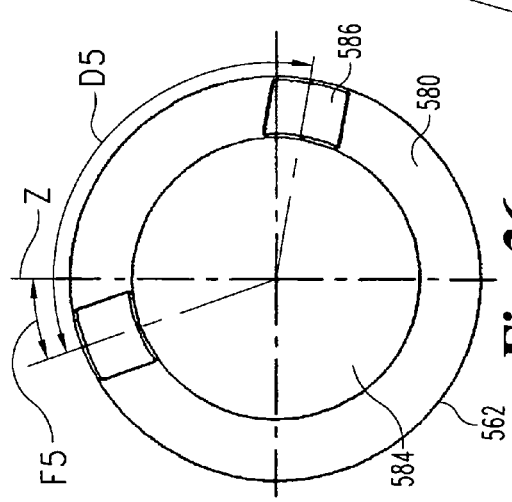
FIG. 26 is an end view of the indexing spacer of FIG. 25 taken along line 26—26.

In the embodiment illustrated in FIGS. 25, 26, 27, and 28, an indexing spacer 562 is shown. The indexing spacer 562 is similar to the indexing spacer 62. The indexing spacer 562 includes a first face 580 and a second face 582 facing in opposite directions. The indexing spacer 562 also defines a passageway 584. First face 580 includes lugs 586 of the first set to enable repeatedly assembling with and dis-assembling from one of either the indexing grooves 76 of the first set or the indexing grooves 78 of the second set. The lugs 586 are circularly indexed through an angle, D5, relative to a passageway axis, Y5. As illustrated in FIG. 26, the lugs 586 of the first set include a pair of lugs circularly indexed through the angle, D5, of 120°. In the illustrated embodiment, the first set of lugs 586 is circularly indexed through an angle, F5, measured from a vertical plane, Z. The angle, F5, is 20° in this embodiment. In alternate embodiments, the number of lugs 586 and the angle, D5, can vary as desired. As shown in FIG. 27, second face 582 includes lugs 588 of the second set to enable repeatedly assembling with and dis-assembling from another of either the indexing grooves 76 of the first set or the indexing grooves 78 of the second set. In this embodiment, the lugs 588 of the second set consist of three lugs 588. In alternate embodiments, any number of lugs 588 can be used as desired. In this embodiment, each of the lugs 588 is circularly indexed through an angle, E5, relative to a passageway axis, Y5. As illustrated in FIG. 27, the angle, E5, is 90°; however, in alternate embodiments the angle, E5, can vary as desired.

Figure 31:
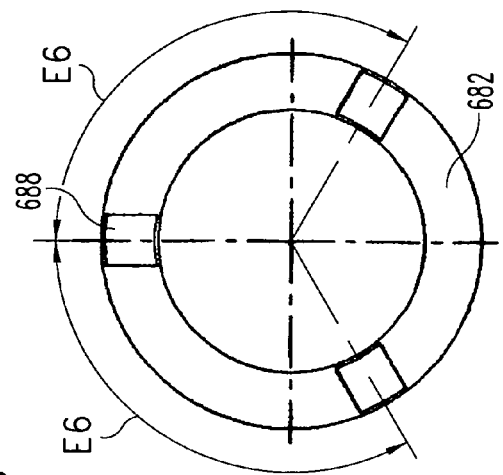
FIG. 31 is an end view of the indexing spacer of FIG. 29 taken along line 31—31.
Figure 32:
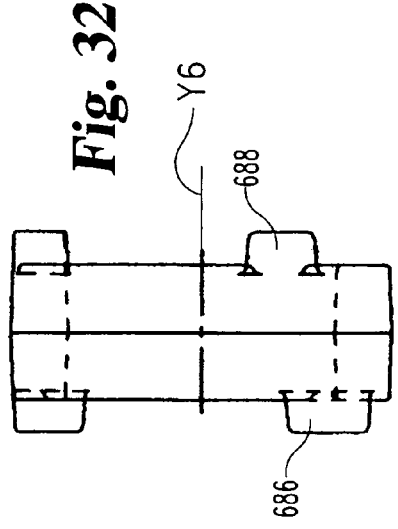
FIG. 32 is a side view of the indexing spacer of FIG. 29 taken along line 32—32.
Figure 29:
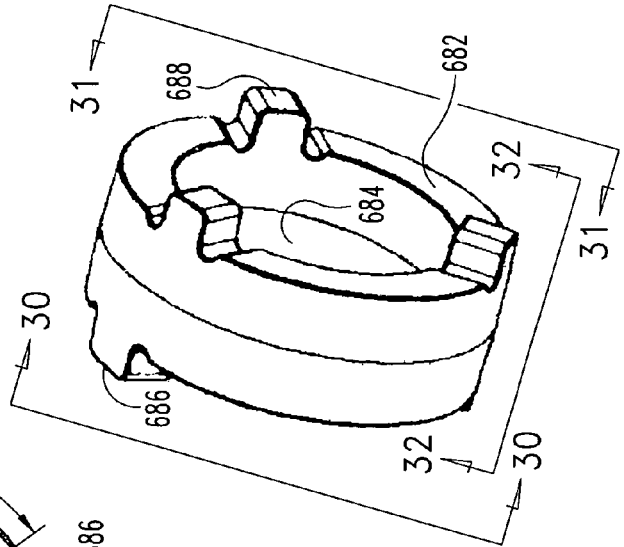
FIG. 29 is a perspective view of an indexing spacer according to another pattern of spacing lugs.
Figure 30:
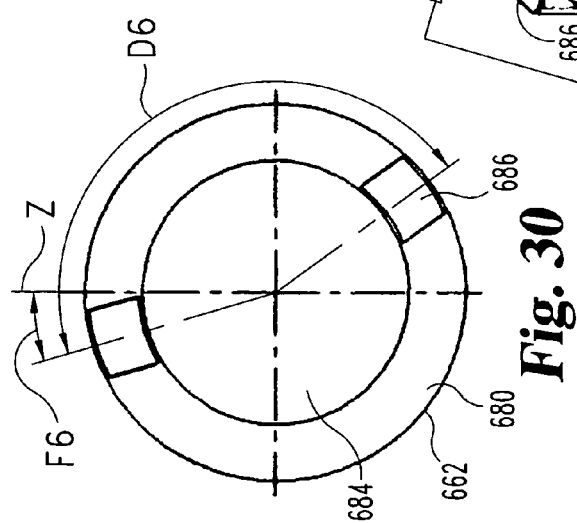
FIG. 30 is an end view of the indexing spacer of FIG. 29 taken along line 30—30.

Illustrated in FIGS. 29, 30, 31, and 32, an indexing spacer 662 is shown. The indexing spacer 662 is similar to the indexing spacer 62. The indexing spacer 662 includes a first face 680 and a second face 682 facing in opposite directions. The indexing spacer 662 also defines a passageway 684. First face 680 includes lugs 686 of the first set to enable repeatedly assembling with and dis-assembling from one of either the indexing grooves 76 of the first set or the indexing grooves 78 of the second set. The lugs 686 are circularly indexed through an angle, D6, relative to a passageway axis, Y6. As illustrated in FIG. 30, the lugs 686 of the first set include a pair of lugs circularly indexed through the angle, D6, of 160°. In the illustrated embodiment, the first set of lugs 686 is circularly indexed through an angle, F6, measured from a vertical plane, Z. The angle, F6, is 16.5° in this embodiment. In alternate embodiments, the number of lugs 686 and the angle, D6, can vary as desired. As shown in FIG. 31, second face 682 includes lugs 688 of the second set to enable repeatedly assembling with and dis-assembling from another of either the indexing grooves 76 of the first set or the indexing grooves 78 of the second set. In this embodiment, the lugs 688 of the second set consist of three lugs 688. In alternate embodiments, any number of lugs 688 can be used as desired. In this embodiment, each of the lugs 688 is circularly indexed through an angle, E6, relative to a passageway axis, Y6. As illustrated in FIG. 31, the angle, E6, is 120°; however, in alternate embodiments the angle, E6, can vary as desired.

Figure 33:
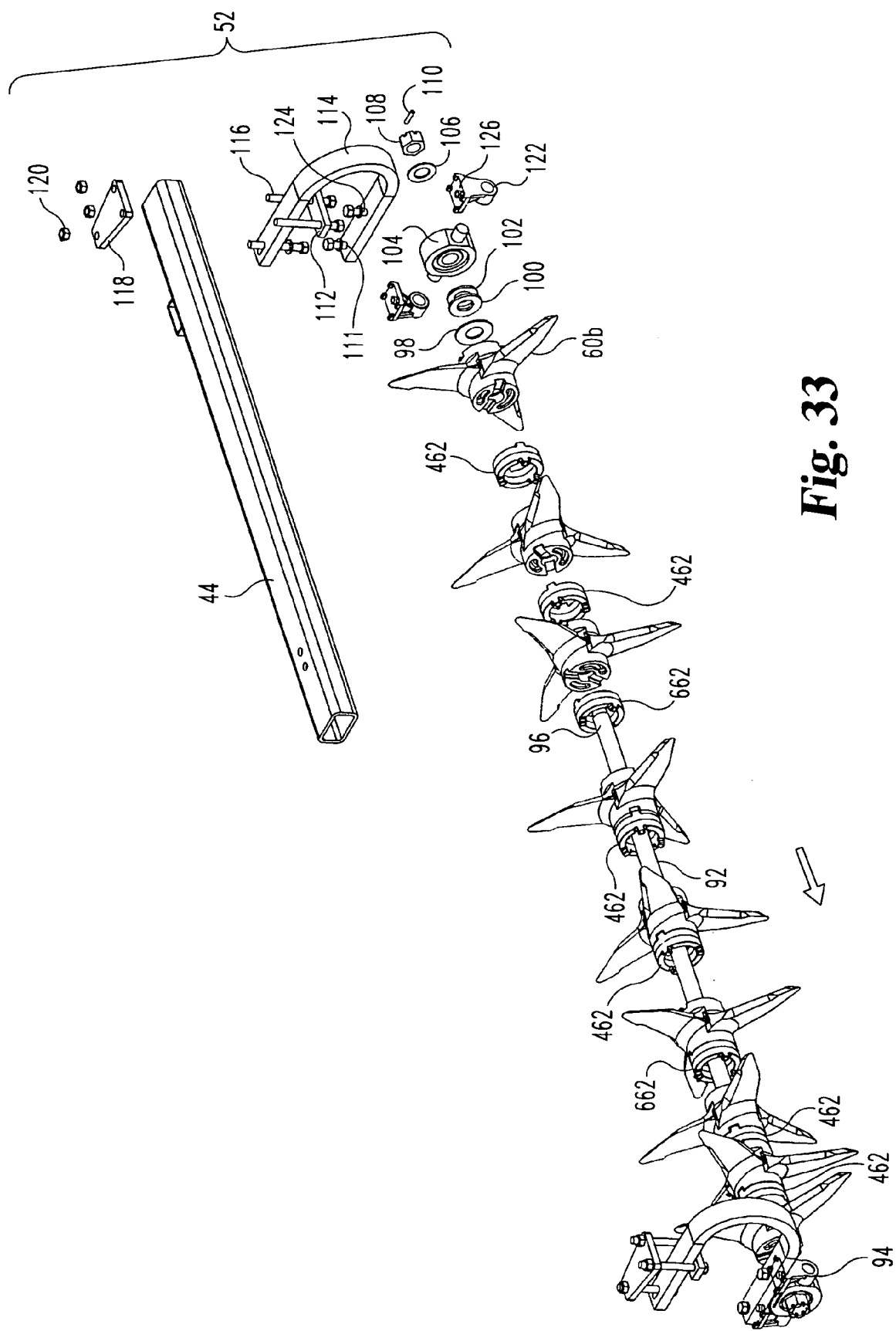
FIG. 33 is a partial exploded perspective view of a left gang assembly according to one embodiment of the present invention.
Figure 34:
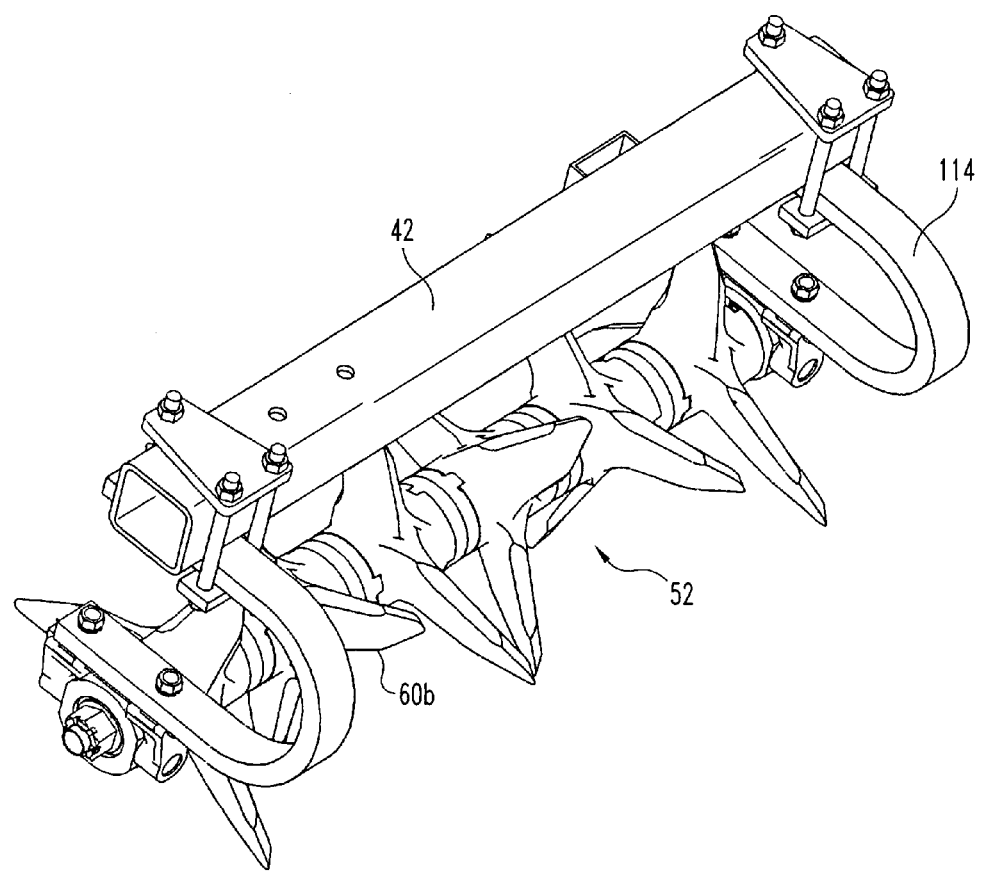
FIG. 34 is a perspective view of a mounted gang assembly incorporating an embodiment of the present invention for the FIG. 1 aerator.

As shown in FIG. 33, the left gang assembly 52 will be described in more detail. In this example, the left gang assembly includes a shaft or draw bolt 92 with a first end 94 and an opposite second end 96. In this example, the length is 5.5 feet; however, in alternate embodiments the length can be different. The first end 94 is closest to the right side 46 and the second end 96 is closest the left side 48 when the left gang assembly 52 is mounted to the left arm 44. The shaft 92 holds nine left hand tine units 60b, two indexing spacers 662, and six indexing spacers 462. In this example, the left gang assembly 52 is assembled from the first end 94 towards the second end 96. In other embodiments, the left gang assembly 52 can be assembled from the second end 96 towards the first end 94. The first left hand tine unit 60b is slid onto the shaft 92 to the first end 94 such that the second face 74b is positioned to receive the indexing spacer 462 and the first face 72b is nearest the first end 94 of the shaft 92. Next, one of the indexing spacers 462 is slid in the direction of the arrow in FIG. 33 onto the shaft 92 such that the lugs 488 assemble with the indexing grooves 78b of the first left hand tine unit 60b. A second left hand tine unit 60b is slid in the direction of the arrow in FIG. 33 onto the shaft 92 such that the indexing grooves 76b assemble with the lugs 486. Next, another one of the indexing spacers 462 is slid in the direction of the arrow in FIG. 33 onto the shaft 92 such that the lugs 488 assemble with the indexing grooves 78b of the second left hand tine unit 60b. A third left hand tine unit 60b is slid onto the shaft 92 such that the indexing grooves 76b assemble with the lugs 486. Next, one of the indexing spacers 662 is slid onto the shaft 92 such that the lugs 688 assemble with the indexing grooves 78b of the third left hand tine unit 60b. A fourth left hand tine unit 60b is slid onto the shaft 92 such that the indexing grooves 76b assemble with the lugs 686. Next, an indexing spacer 462 is slid onto the shaft 92 such that the lugs 488 assemble with the indexing grooves 78*b* of the fourth left hand tine unit 60*b*. A fifth left hand tine unit 60*b* is slid onto the shaft 92 such that the indexing grooves 76*b* assemble with the lugs 486. Next, another indexing spacer 462 is slid onto the shaft 92 such that the lugs 488 assemble with the indexing grooves 78*b* of the fifth left hand tine unit 60*b*. A sixth left hand tine unit 60*b* is slid onto the shaft 92 such that the indexing grooves 76*b* assemble with the lugs 486. Next, another of the indexing spacers 662 is slid onto the shaft 92 such that the lugs 688 assemble with the indexing grooves 78*b* of the sixth left hand tine unit 60*b*. A seventh left hand tine unit 60*b* is slid onto the shaft 92 such that the indexing grooves 76*b* assemble with the lugs 686. Another indexing spacer 462 is slid onto the shaft 92 such that the lugs 488 assemble with the indexing grooves 78*b* of the seventh left hand tine unit 60*b*. An eighth left hand tine unit 60*b* is slid onto the shaft 92 such that the indexing grooves 76*b* assemble with the lugs 486. Yet another indexing spacer 462 is slid onto the shaft 92 such that the lugs 488 assemble with the indexing grooves 78*b* of the eighth left hand tine unit 60*b*. A ninth left hand tine unit 60*b* is slid onto the shaft 92 such that the indexing grooves 76*b* assemble with the lugs 486 and the second face 74*b* is nearest the second end 96.

In the example in FIG. 33, the first end 94 and the second end 96 are each attached to the left arm 44 in the same manner. The left gang assembly 52 includes an end spacer 98 as shown in FIG. 33. A first end spacer 98 is slid onto the first end 94 of the shaft 92 next to the first face 72*b* of the first left hand tine unit 60*b*. A second end spacer 98 is slid onto the second end 96 of the shaft 92 next to the first face 72*b* of the ninth left hand tine unit 60*b*.

The left gang assembly 52 also includes a Belleville washer 100 as shown in FIG. 33. A first Belleville washer 100 is slid onto the first end 94 of the shaft 92 next to the first end spacer 98. A second Belleville washer 100 is slid onto the second end 96 of the shaft 92 next to the second end spacer 98. As should be appreciated, the Belleville washer 100 is a spring washer.

The left gang assembly 52 further includes a burnout end spacer 102 placed next to first Belleville washer 100 and the second Belleville washer 100. As should be appreciated, the end spacer maintains an adequate clearance between the bearing assembly and other components.

As shown in FIG. 33, the left gang assembly 52 includes a trunion bearing assembly 104 that slides onto the shaft 92. The first trunion bearing assembly 104 is slid onto the first end 94 of the shaft 92 next to the burnout end spacer 102. A second trunion bearing assembly 104 is slid onto the second end 96 of the shaft 92.

The left gang assembly 52 further includes a washer 106 that slides onto the shaft 92. A first washer 106 is slid onto the first end 94 of the shaft 92 next to the first trunion bearing assembly 104. A second washer 106 is slid onto the second end 96 next to the second trunion bearing assembly 104.

As shown in FIG. 33, the left gang assembly 52 includes a castellated nut 108 screwed onto the shaft 92 and locked by a spring pin 110. This secures the left hand tine units 60*b*, the indexing spacers 662, and the indexing spacers 462 in an assembled position.

Each end of the left gang assembly 52 is mounted to left arm 44 by a flex member 114 clamped to left arm 44 as shown at the left-hand side of FIG. 33. The flex member 114 can bend to allow the shaft 92 to move vertically as the aerator 40 moves horizontally. For example, the flex member 114 enables the left gang assembly 52 to traverse rocks while the aerator 40 is pulled by the tractor. The flex member 114 can be made of any material that allows the flex member 114 to bend elastically, such as ductile iron or steel. The flex member 114 is a "C" shape; however, other shapes can be used as desired. The flex member 114 also defines holes 111. A bar 112, a set of bolts 116, a plate 118, and a set of nuts 120 attach the flex member 114 to the left arm 44 as shown in FIG. 33. The bar 112 defines a pair of holes for receiving the bolts 116. The plate 118 also defines holes for receiving the set of bolts 116. The bar 112 is placed next to the flex member 114 as shown in FIG. 33 and two of the bolts 116 are placed through the pair of holes in bar 112. Next, the plate 118 is placed on the left arm 44 as shown in FIG. 33. The set of bolts 116 are inserted through the holes in plate 118, and the set of nuts 120 are screwed onto the set of bolts 116 to clamp the flex member 114 to the left arm 44. Next, the ends of the left gang assembly 52 are attached to the flex members 114 with a pair of trunion mounts 122 and a pair of bolts 124. Each of the trunion mounts 122 also defines a hole 126 as shown in FIG. 33. The trunion mounts 122 are attached to the trunion bearing assembly 104. Each of the bolts 126 is inserted through the hole 111 and the hole 126 to mount each end of the left gang assembly 52 to the flex member 114.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of indexing tools in an agricultural machine, comprising:

providing a shaft, a plurality of tine units, and a plurality of indexing spacers;

sliding one of said plurality of tine units and one of said plurality of indexing spacers onto said shaft for rotation about a rotational axis of said shaft;

assembling on said shaft in series alternately said tine units and said indexing spacers, wherein said spacers maintain said tine units in predetermined rotational index orientations to form an assembly; and interfitting indexing means on said tine units with indexing means on said spacers to establish different rotational index orientations of said tine units.

2. The method of claim 1 which further comprises mounting said assembly onto a frame in a forwardly inclined direction; and converging said assembly toward a centerline of said frame in a direction of intended travel of the machine.

3. The method of claim 2 and further comprising:

mounting a second assembly of tine units and indexing spacers onto said frame; and offsetting said first assembly a distance, in said direction of travel, from said second assembly.

4. The method of claim 1 which further comprises disassembling said assembly to separate said shaft, said plurality of tine units, and said plurality of indexing spacers.

5. An apparatus for working soil, comprising:

a frame;

a plurality of tine units rotatably mounted to said frame in series for rotation in unison, each of said tine units having a hub and a plurality of tines extending from said hub;

wherein said hub has a first surface defining a first set of indexing receivers and a second surface defining a second set of indexing receivers;

a plurality of indexing spacers having lugs thereon, at least one indexing spacer of said plurality of indexing spacers separating each tine unit from the next tine unit in said series of tine units, and for assembling said tine units and said spacers on said frame with said lugs of said indexing spacers mated with selected ones of said first set of indexing receivers or said second set of indexing receivers;

wherein each of said indexing spacers includes a first face and a second face, said first face being adapted to assemble with either one of said first set of indexing receivers or said second set of indexing receivers, and said second face being adapted to assemble with the other one of said first set of indexing receivers or said second set of indexing receivers; and said first face includes a first plurality of lugs for assembling with either one of said first set of indexing receivers or said second set of indexing receivers, and said second face includes a second plurality of lugs for assembling with the other one of said first set of indexing receivers or said second set of indexing receivers.

6. The apparatus of claim 5 wherein said plurality of tine units establish and maintain a predetermined angular orientation of said tines.

7. An apparatus for working soil comprising:
a frame;
a plurality of tine units mounted on said frame for rotation, each tine unit of said plurality of tine units having a hub and a plurality of tines extending from said hub;
a plurality of indexing spacers for separating each tine unit of said plurality of tine units from the next adjacent tine unit of said plurality of tine units, each of said indexing spacers having a first face and a second face;
said first face having a set of indexing features configured to repeatedly assemble with and repeatedly dis-assemble from one of said plurality of tine units;
said second face having a second set of indexing features, said second set of indexing features being different than said first set of indexing features, said second set of indexing features configured to repeatedly assemble with and repeatedly dis-assemble from another of said plurality of tine units;
wherein said hub has a first surface defining a first set of indexing receivers and a second surface defining a second set of indexing receivers; and
wherein said first set of indexing features of said indexing spacers includes a first plurality of lugs for repeatedly assembling with and repeatedly dis-assembling from either said first set of indexing receivers or said second set of indexing receivers, and said second set of indexing features of said indexing spacers includes a second plurality of lugs for repeatedly assembling with and repeatedly dis-assembling from the other one of said first set of indexing receivers or said second set of indexing receivers.

8. An apparatus for working soil comprising:
a frame;
a pair of tine units mounted on said frame for rotation, each tine unit of said pair of tine units having a hub and a plurality of tines extending from said hub;
an indexing spacer for separating two of said tine units, one side of said indexing spacer having a first indexing feature in interlocking contact with the hub of a first one of said tine units and a second side of said indexing spacer having a second indexing feature in interlocking contact with the hub of a second one of said tine units, wherein the first indexing feature is different than the second indexing feature; and wherein said first indexing feature includes a plurality of lugs having a rectangular shape and said second indexing feature includes a plurality of lugs having a circular shape.

9. An apparatus for working soil comprising:
a frame;
a pair of tine units mounted on said frame for rotation, each tine unit of said pair of tine units having hub and a plurality of tines extending from said hub;
an indexing spacer for separating two of said tine units, one side of said indexing spacer having a first indexing feature in interlocking contact with the hub of a first one of said tine units and a second side of said indexing spacer having a second indexing feature in interlocking contact with the hub of a second one of said tine units, wherein the first indexing feature is different than the second indexing feature; and wherein said first indexing feature includes a plurality of projections in a first circumferential pattern and said second indexing feature includes a plurality of projections in a second circumferential pattern, said first pattern being different than said second pattern.

10. An apparatus for working soil comprising:
a frame;
a plurality of tine units rotatably supported by said frame for rotation about an axis, each said tine unit having a hub and a plurality of tines extending from said hub, a first side of each said hub extending about the axis on one side of the corresponding plurality of tines a second side of each said hub extending about the axis on the other side of the corresponding plurality of tines;
wherein each first side has a first indexing feature and each second side has a second indexing feature, said first indexing feature being different than said second indexing feature;
wherein either of said first indexing feature or said second indexing feature defines at least one indexing receiver; and
wherein the other of said first indexing feature or said second indexing feature includes at least one lug.

11. An apparatus for working soil comprising:
a frame;
a plurality of tine units rotatably supported by said frame for rotation about an axis, each said tine unit having a hub and a plurality of tines extending from said hub, a first side of each said hub extending about the axis on one side of the corresponding plurality of tines, a second side of each said hub extending about the axis on the other side of the corresponding plurality of tines;
wherein each first side has a first indexing feature and each second side has a second indexing feature, said first indexing feature being different than said second indexing feature; and
wherein said first indexing feature includes a first plurality of lugs and said second indexing feature includes a second plurality of lugs, wherein said first plurality of lugs is different than said second plurality of jugs.

* * * * *

UNITED STATES PATENT AND TRADEMARK OFFICE
CERTIFICATE OF CORRECTION

PATENT NO. : 7,172,032 B2  
APPLICATION NO. : 10/943168  
DATED : February 6, 2007  
INVENTOR(S) : McKinley et al.

Page 1 of 1

It is certified that error appears in the above-identified patent and that said Letters Patent is hereby corrected as shown below:

<u>Column 12,</u>  
Line 61, please change "a plurality of [[fine]] units rotatably mounted to said frame in" to --a plurality of <u>tine</u> units rotatably mounted to said frame in--

<u>Column 13,</u>  
Line 15, please change "second set of indexing receivers; and said first face" to  
--second set of indexing receivers; and  
said first face--

<u>Column 14,</u>  
Line 13, please change "each tine unit of said pair of tine units having hub and" to  
--each tine unit of said pair of tine units having <u>a</u> hub and--

<u>Column 14,</u>  
Line 34, please change "one side of the corresponding plurality of tines a second" to  
-- one side of the corresponding plurality of tines<u>,</u> a second --

<u>Column 14,</u>  
Line 62, please change "lugs is different than said second plurality of [[jugs]]." to  
-- lugs is different than said second plurality of <u>lugs</u>. --

Signed and Sealed this

Tenth Day of April, 2007

JON W. DUDAS  
*Director of the United States Patent and Trademark Office*